June 13, 1939.  D. W. PHILLIPS  2,162,444

DENTAL PIN

Filed April 10, 1937

Inventor:
David W. Phillips.
By Chritton, Wiles, Davies, Hirsch & Dawson.
Attys.

Patented June 13, 1939

2,162,444

UNITED STATES PATENT OFFICE 2,162,444

DENTAL PIN

David W. Phillips, Chicago, Ill.

Application April 10, 1937, Serial No. 136,187

1 Claim. (Cl. 32—15)

This invention relates to an improved dental pin.

An object of the invention is to provide a pin which may be easily inserted and removed from a tooth cavity that has been prepared to receive the pin. Another object is to provide a pin which may be conveniently and cleanly handled when cement is applied to all points on its bottom and side surfaces. A still further object is to provide means for holding and handling the pin during fitting and cementing operations, which means may be easily severed from the body of the pin without distorting the position or edge outlines of the pin where it joins the tooth.

The invention is illustrated in a preferred embodiment by the accompanying drawing, in which—

Figure 1:
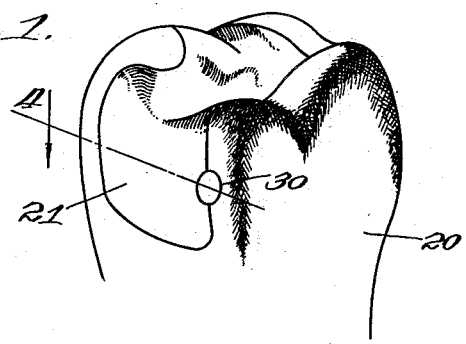
Figure 2:
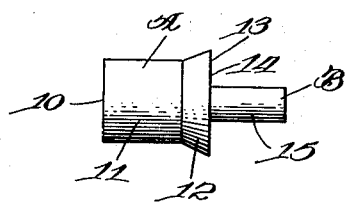
Figure 3:
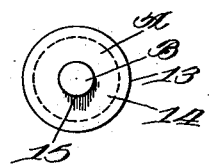
Figure 4:
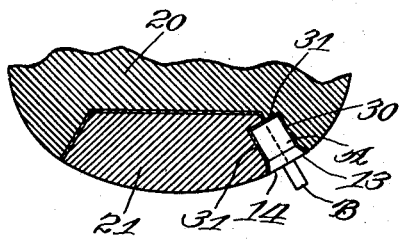
Figure 5:
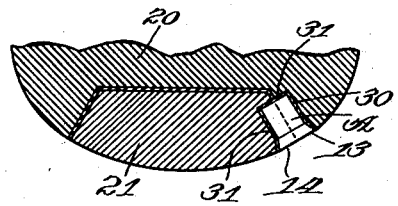

Figure 1 is a perspective view of a tooth equipped with an inlay and having a cavity in which the pin may be inserted; Fig. 2, a side view of the improved pin; Fig. 3, a top end view of the pin as shown in Fig. 2; Fig. 4, a sectional view of the tooth structure and showing the improved pin after it has been cemented in place, the section being taken as indicated at line 4 of Fig. 1; and Fig. 5, a sectional view similar to Fig. 4, but showing the completed structure with the handle severed from the pin.

As shown more clearly in Figs. 2 and 3, my improved pin comprises a pin body A equipped with a handle portion B.

The pin body A, having a bottom 10 and cylindrical sides 11, is preferably equipped with a beveled edge 12, so that its top outer edge 13 has greater diameter than does sides 11. However, body A may be simply cylindrical and the beveled top portion omitted, if so desired.

Extending axially of body A and projecting from the flat top side 14 is the cylindrical extension B of reduced diameter which is preferably formed integrally with body portion A. The extension B is smaller in diameter than is body A and the junction between its sides 15 with top face 14 is well inward of top outer edge 13. Though extension B is here described as being cylindrical and axial with body A, it is understood that this member might also be of other shapes and otherwise joined with the face 14 of body A.

In using the improved pin in forming a tooth structure the dentist first prepares the tooth 20 and inlay 21 in the usual way to form some such structure as illustrated in Fig. 1. A pin may then be used in the following manner to lock the inlay in place.

The dentist may drill the hole to provide a cavity 30 into the tooth 20 and inlay 21 to receive the pin. This cavity is drilled to the depth and diameter of the pin. The pin to be used is fitted and tried in order to be certain of correct fit in the cavity. To try the pin in the cavity the dentist may hold the pin by grasping its handle B with a pair of tweezers and may insert the pin into the cavity and pull it out at will after having tested the fit in the cavity. Even when the top of the pin body comes flush with the top edge of the cavity, the pin may easily be pulled out to receive the cement.

In the case of the ordinary pins which were previously used, when the cavity comes to be the correct size and the pin is properly fitted, the pin cannot be easily taken out again, and in prodding around the edges of the common type of pin to extricate it there is great danger of mutilating both the pin edges and the margin of the cavity and impairing work to some extent. This difficulty is eliminated in the use of the improved type of pin.

After the cavity is prepared and the pin removed, the cavity and the bottom and sides of the pin must be coated with cement 31 and then permanently placed in the cavity. In the case of the ordinary pin there was great difficulty in getting the cement on all parts of the side and bottom surfaces of the pin because it was necessary to hold the pin by tweezers or other means which necessarily covered up a part of the surface intended to be covered with cement.

By using the improved pin just described, the dentist may hold the handle B which is free from cement by tweezers and can coat all the surfaces of the pin that engage the cavity without difficulty or interference.

After the pin has been properly cemented in the cavity with its top surface flush and even with the outer surface of the tooth, the dentist may easily snip off the handle B at its base, and then buff the top surface of the pin smooth. Since the handle B is of greatly reduced diameter, it is easily snipped off without danger of deforming the delicate edge portions of the top pin surface or disturbing the cement layer.

As thus employed, the improved pin simplifies the work in the use of pins and facilitates attaining perfect marginal adaptation between the pin edges and the cavity margins.

The pin may, of course, be used independently in the tooth structure without any associated inlay. For example, the pin alone is very well adapted for inlaying small cavities, such as pit cavities, and can be used in association with other restorations, etc.

The foregoing detailed description has been given for clearness of understanding only, and no unnecessary limitations should be understood therefrom, but the appended claim should be construed as broadly as permissible, in view of the prior art.

I claim:

A dental pin for locking an inlay within a tooth structure, comprising a cylindrical pin body adapted to be received within a pin recess in the inlay and tooth structure with the exposed end of the pin body flush with the adjoining tooth surface, and a handle portion of reduced cross-section extending from the outer end of said pin body, the junction between said handle and said pin body being within and spaced from the circular border of said pin body.

DAVID W. PHILLIPS.